US007558269B2

(12) United States Patent
Le Pennec et al.

(10) Patent No.: US 7,558,269 B2
(45) Date of Patent: Jul. 7, 2009

(54) METHOD FOR TRANSMITTING HIGH-PRIORITY PACKETS IN AN IP TRANSMISSION NETWORK

(75) Inventors: Jean-François Le Pennec, Nice (FR); Claude Galand, La Colle sur Loup (FR); Didier F. Giroir, Cagnes sur Mer (FR)

(73) Assignee: AT&T Intellectual Property II, L.P., Reno, NV (US)

( * ) Notice: Subject to any disclaimer, the term of this patent is extended or adjusted under 35 U.S.C. 154(b) by 818 days.

(21) Appl. No.: 10/638,898

(22) Filed: Aug. 11, 2003

(65) Prior Publication Data

US 2005/0175013 A1 Aug. 11, 2005

(30) Foreign Application Priority Data

Feb. 24, 2003 (FR) ................................. 03 02243

(51) Int. Cl.
*H04L 12/28* (2006.01)
(52) U.S. Cl. .................................................. 370/395.42
(58) Field of Classification Search ............ 370/395.42, 370/395.4, 389, 395.1, 395.41
See application file for complete search history.

(56) References Cited

U.S. PATENT DOCUMENTS

| 6,766,515 | B1 * | 7/2004 | Bitar et al. .................. 718/100 |
| 6,798,743 | B1 * | 9/2004 | Ma et al. ..................... 370/235 |
| 6,907,258 | B2 * | 6/2005 | Tsutsumi et al. ............. 455/512 |
| 6,980,549 | B1 * | 12/2005 | Shabtay et al. ............... 370/392 |
| 6,987,777 | B1 * | 1/2006 | Cain et al. ................... 370/466 |
| 2001/0055300 | A1 * | 12/2001 | Chen ........................... 370/352 |
| 2002/0071434 | A1 * | 6/2002 | Furukawa .................... 370/392 |
| 2004/0148423 | A1 * | 7/2004 | Key et al. .................... 709/235 |
| 2005/0021864 | A1 * | 1/2005 | Sherman et al. ............. 709/247 |
| 2007/0183421 | A1 * | 8/2007 | Terrell et al. ................ 370/389 |

FOREIGN PATENT DOCUMENTS

| EP | 1128612 A2 * | 8/2001 |
| FR | 2851708 A1 * | 8/2004 |
| WO | WO 01/26326 A1 | 4/2001 |
| WO | WO 02/089427 A1 | 11/2002 |

* cited by examiner

*Primary Examiner*—Seema S Rao
*Assistant Examiner*—Xavier Wong

(57) ABSTRACT

Method for transmitting high-priority packets in an IP transmission network based upon the Internet Protocol (IP) wherein low-priority packets or fragments of packets are transmitted between a sender and a receiver and at least a high-priority packet can be transmitted from the sender to the receiver by pre-emption of a low-priority packet or a fragment of packet. the method comprises in the sender, the steps of determining whether a low-priority packet or fragment of packet is being transmitted from the sender to the receiver when a high-priority packet has to be transmitted, setting to 1 a reserved bit within the IP header of the high-priority packet used as a pre-emption indicator if a low-priority packet or fragment of packet is currently transmitted, transmitting the high-priority packet with the pre-emption indicator set to 1 from the sender to the receiver, and resuming the transmission of the low-priority packet or fragment of packet at the end of transmission of the high-priority packet.

9 Claims, 3 Drawing Sheets

METHOD FOR TRANSMITTING HIGH-PRIORITY PACKETS IN AN IP TRANSMISSION NETWORK

TECHNICAL FIELD

The present invention relates generally to the transmission of voice and data packets in a digital transmission network and relates more particularly to a method for transmitting high-priority packets in an IP transmission network.

BACKGROUND

In a digital transmission network, data from a large number of users are serially transmitted from one network node to another network node, up to their respective final destinations.

Due to the evolution of networks toward more and more complex mixtures of sub-networks with heterogeneous architectures, it is clear that there will be a future requirement to support distributed computing applications across high speed backbones that may be carrying LAN traffic, voice, video and other traffic among channel-attached hosts and work stations. Perhaps the fundamental challenge for high speed networking is to minimize the processing time within each node in the network.

Packet switching is now commonly used to accommodate the bursty, multiprocess communication found in distributed computing environments. To accomplish this, packets carrying bursty data traffic can be assigned a low non-real-time priority, while packets carrying voice and video traffic can be assigned a high, real-time priority. A node in a fast packet switching network contains buffers for holding packets waiting for transmission on its communication links. Packets waiting for transmission can be held in buffers managed differently, depending on the priority assigned to the packets.

Several service policies can be adopted in order to transmit packets from different priority queues such as transmission without pre-emption, pre-emption with retransmission or priority with restart. When no pre-emption is used, the packet priority is only examined to determine from which queue to select the next packet for transmission. If a high-priority packet is placed in the queue while a low-priority packet is being transmitted, the high-priority packet must wait until the current transmission is completed. A pre-emption with retransmission service policy means that the node will abort the transmission of a low-priority packet upon the arrival of a high-priority packet and transmit the high-priority packet. Once all high-priority packets have been transmitted, transmission of the pre-empted low-priority packet will be restarted from the beginning of the packet. A pre-emption with restart service policy is similar except that the transmission of the pre-empted low-priority packet is restarted from the point of interruption rather than the beginning.

Both the transmission without pre-emption and the pre-emption with retransmission service policies can be implemented using the existing HDLC MAC-layer protocol. For pre-emption with resume service policy, a modified HDLC MAC-layer protocol is described in EP 0.582.537 wherein three types of specific flags are used to delimit packets for allowing high-priority packets to temporarily pre-empt low-priority packets. But this system requires that the hardware be capable of scanning the incoming bit stream, of recognizing special non-standard flags in addition to the HDLC flags, and of running a protocol to verify a set of rules upon detection of these flags. Clearly, special hardware is necessary for that purpose.

A system described in U.S. Pat. No. 5,557,608 overcomes the above drawback. In this system, an incoming real-time packet is embedded after the block of data of the non-real-time packet being transmitted. This is accomplished by transmitting each packet along with at least a 1-byte trailer which is used to indicate the packet type, whether the current block of non-real-time data is pre-empted or whether the current block of non-real-time data is resumed.

But when the protocol being used between a sender and a receiver is always Internet Protocol (IP), the complex mechanism described in U.S. Pat. No. 5,557,608 is not required. In the latter patent, the protocol used does not take advantage of the fact that all transmitted layer 2 packets start with an IP header as defined by the IP protocol suite. Therefore, a new field needs to be added to transport various indicators between the sender and the receiver.

SUMMARY OF THE INVENTION

Accordingly, the main object of the invention is to achieve a method for transmitting high-priority packets in a transmission network using the IP protocol wherein it is not required to add extra bytes to the data to indicate that low-priority data are pre-empted or restarted after pre-emption.

Another object of the invention is to achieve a method for transmitting high-priority packets in a transmission network transporting only IP traffic, wherein only a reserved bit in the IP header of the packet indicates whether low-priority data are pre-empted or restarted.

The invention relates therefore to a method for transmitting high-priority packets in an IP transmission network based upon the Internet Protocol (IP) wherein low-priority packets or fragments of packets are transmitted between a sender and a receiver and at least a high-priority packet can be transmitted from the sender to the receiver by pre-emption of a low-priority packet or a fragment of packet.

In the transmitter or sender, the method comprises the steps of determining whether a low-priority packet or fragment of a packet is being transmitted from the sender to the receiver when a high-priority packet has to be transmitted, setting to 1 a reserved bit within the IP header of the high-priority packet used as a pre-emption indicator if a low-priority packet or fragment of a packet is currently transmitted, transmitting the high-priority packet with the pre-emption indicator set to 1 from the sender to the receiver, and restarting the transmission of the low-priority packet or fragment of a packet at the end of transmission of the high-priority packet.

In the receiver, the method comprises the steps of determining whether a high-priority packet is received by the receiver, determining, when a high-priority packet is received by the receiver, and whether a reserved bit within the IP header of the high-priority packet used as a pre-emption indicator is set to 1, and waiting for the reception of a new packet if the reserved bit is set to 1 indicating that the high-priority packet has pre-empted a low-priority packet.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

A packet-switching network usually consists of switching nodes and communication links or trunks between these nodes. Each of these nodes is linked to at least one other node through one or more communication links. The switching nodes are data processing systems having transmit/receive adapters connected to the communication links. At each node, incoming data packets are selectively routed to one or more of the outgoing communication links which terminate at another node. Such routing decisions are made in response to information in the header of the data packet.

In a packet-switching network, packets are pieces of data which are prefixed with headers containing control and routing information that identifies the originating and destination users. Each node examines each header and decides where to send the packet to move it closer to its destination.

Figure 1:
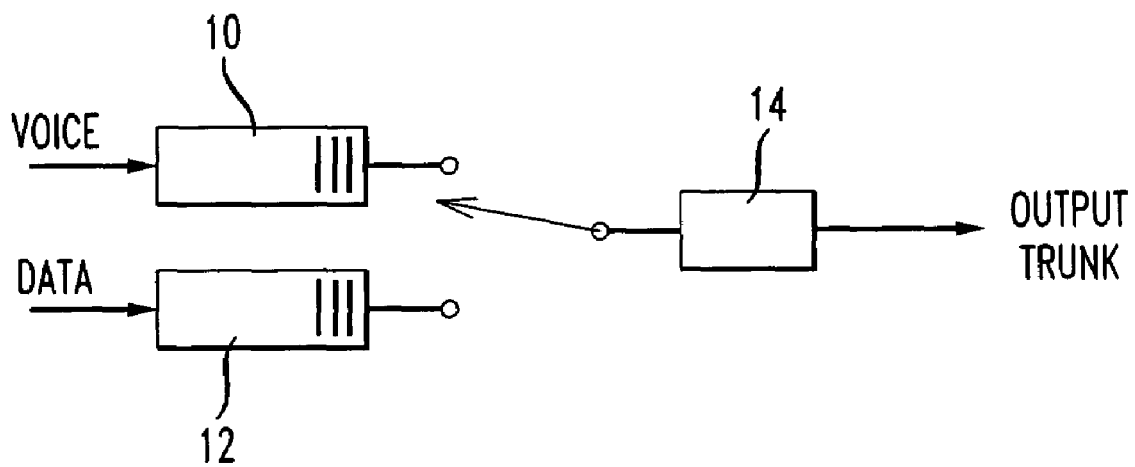
FIG. 1 is a schematic representation of an output adapter in a node of a digital transmission network within which the invention may be implemented.

FIG. 1 represents the output adapter structure including two queue devices 10 and 12 and a scheduler 14. The packets received by the output adapter are stored in one of the queue devices according to their type—that is voice packets in queue device 10 and data packets in queue device 12. Scheduler 14 implements a policy to forward these packets to the output trunk.

Voice packets are given a high-priority with respect to data packets which are given a low-priority in order to reduce the delay for high-priority packets. For each type of packet, voice or data, the packets are served in sequence, that is in the same order that they arrive.

A packet queued in queue device 12 is served only if queue device 10 having the highest priority is empty, and the transmission of the low-priority packets is interrupted when a high-priority packet arrives before the end of transmission. Then, the transmission of the low-priority packet is restarted after the high-priority packet has been transmitted.

Figure 2:
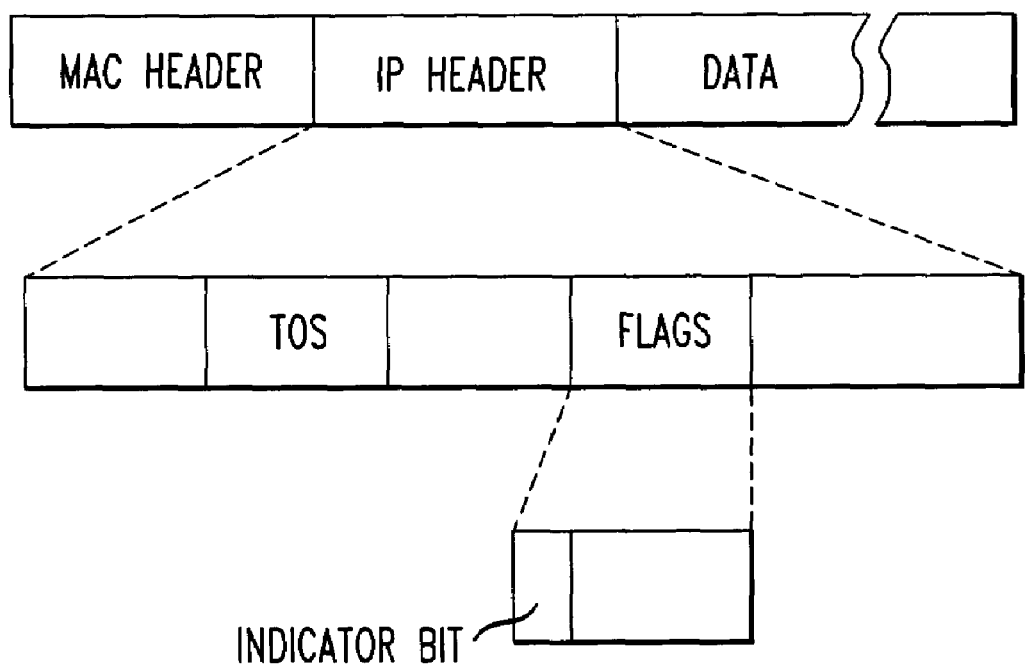
FIG. 2 is a diagram representing the format of the IP header in a packet transmitted using the method according to the invention.

In reference to FIG. 2, each packet includes a MAC header (giving the addresses for the layer 2), an IP header and the data. The IP header of a packet includes a plurality of fields among which the Type Of Service (TOS) field and a Flags field are used in the present invention. TOS field is normally used to specify the type of service requested for the packet transmission over the IP network; but in the present invention, its value indicates if the datagram is a voice packet or a data packet. It must be noted that, although the use of the TOS byte to distinguish between voice and data packets is the preferred implementation, one skilled in the art can easily select other mechanisms to distinguish between voice and data packets without departing from the invention, for example by looking at the values contained in the protocol field within the IP header.

The other field useful in the invention is the "Flags" field which has its first bit which is a reserved bit which should be set to 0. Here, this bit will be used as an indicator bit. Within the data packets, the bit is used, when set, as a "packet start indicator" indicating the first segment of a data packet. Within voice packets, the bit is used, when set, as a "pre-emption indicator" indicating that a voice packet has pre-empted a data packet.

In the transmitter, when a packet (an IP datagram or a fragment of IP datagram if there is a fragmentation) is ready for transmission, the first segment (the only segment if no pre-emption occurred) has its packet start indicator being set. When the packet is pre-empted, all segments except the first one have their packet start indicator which is not set. In other words, when the transmission of the data packet is restarted because the transmission of a voice packet has been completed and there is no new voice packet in the queue, all further segments start with the IP header of the entire packet being replicated, the packet start indicator being not set to 1 in these segments. When the transmission of a data packet or a segment of a data packet has been suspended because there are one or several voice packets to be transmitted, all of the voice packets sent before the end of the transmission of the data packet have their pre-emption indicator which is set.

Figure 3:
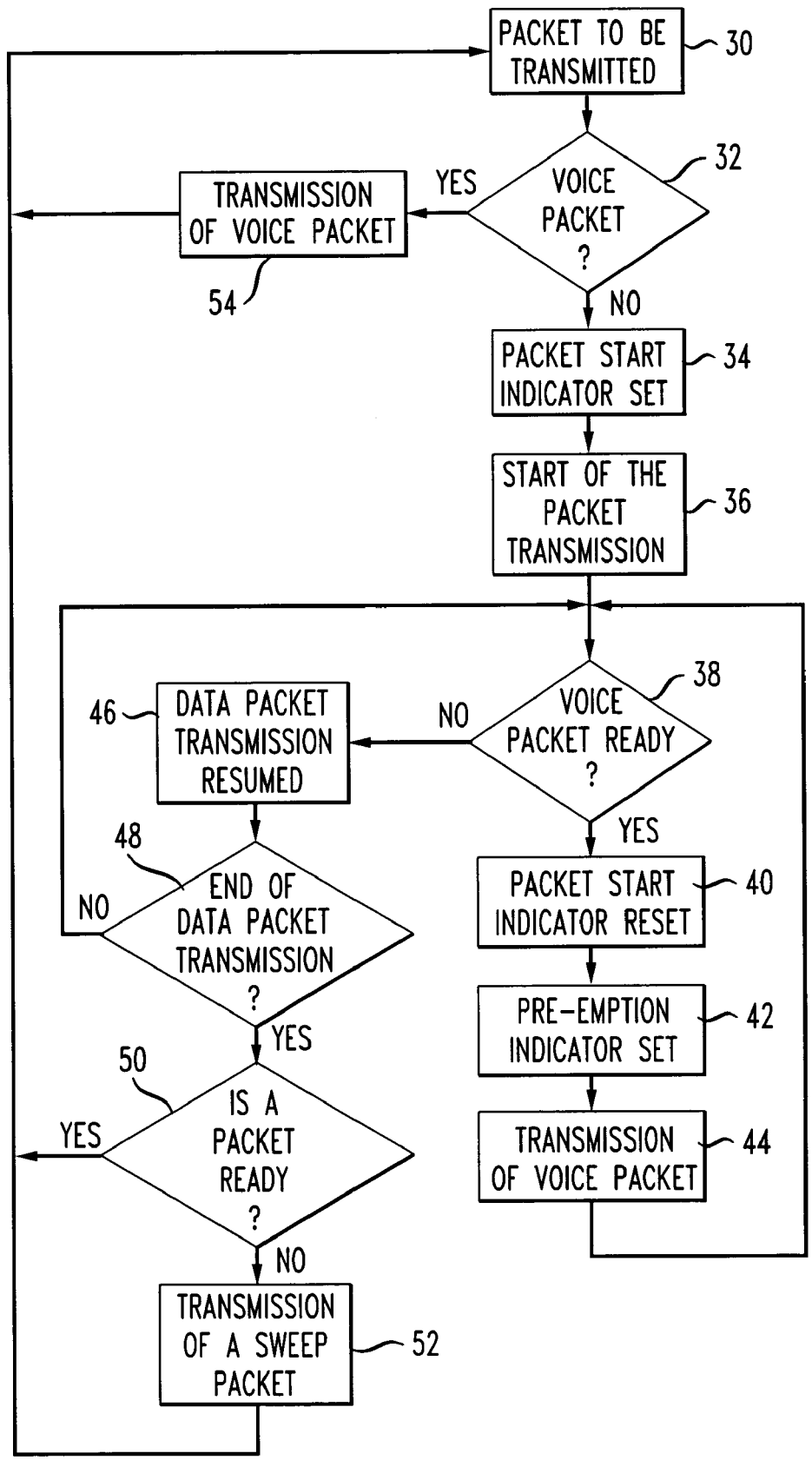
FIG. 3 is a flow chart showing the steps of the method according to the invention which are implemented in the transmitter.

The method according to the present invention on the sender side is now described in reference to FIG. 3. It starts as soon as a packet is ready to be transmitted in the queues (step 30). A test is performed to determine whether it is a voice packet or not (step 32). If the packet to be transmitted is a data packet, the packet start indicator is set (step 34) as a flag in the sender memory and in the data packet to let the receiver know that the transmission of a new data packet has started. Then, this transmission is started (step 36).

It is then determined whether a voice packet is ready (step 38). It must be noted that the test can be performed asynchronously or be performed according to a predetermined period of time which must be less than the duration of a packet. If there is a voice packet ready to be transmitted, the packet start indicator is reset in the flag register (step 40), the pre-emption indicator is set (step 42) as a flag in the sender memory and in the voice packet, and the voice packet is transmitted (step 44) before the process loops back to the determination whether a voice packet is ready (step 38).

If no voice packet is ready to be transmitted, the transmission of the pre-empted data packet is restarted (step 46). Then, it is determined whether the end of the data packet transmission has been reached (step 48). If not, the process is looped back to the determination whether a voice packet is ready (step 38).

When the transmission of the data packet has been completed, it is determined whether there is a new packet ready to be transmitted (step 50). If not, a sweep packet is transmitted (step 52), the goal of such a sweep packet being to let the receiver know that any previously accumulated data are complete and correspond to a data packet. After transmission of this sweep packet, and if there is a packet ready to be transmitted, the process is looped back to the beginning (step 30).

When, at the beginning of the process, it is determined that it is a voice packet which is to be transmitted, the pre-emption indicator is kept off since there is no pre-emption of a data packet. Then, the voice packet is transmitted (step 54), and the process is connected to step of determining whether a new packet (voice or data) is ready to be transmitted (step 50).

Figure 4:
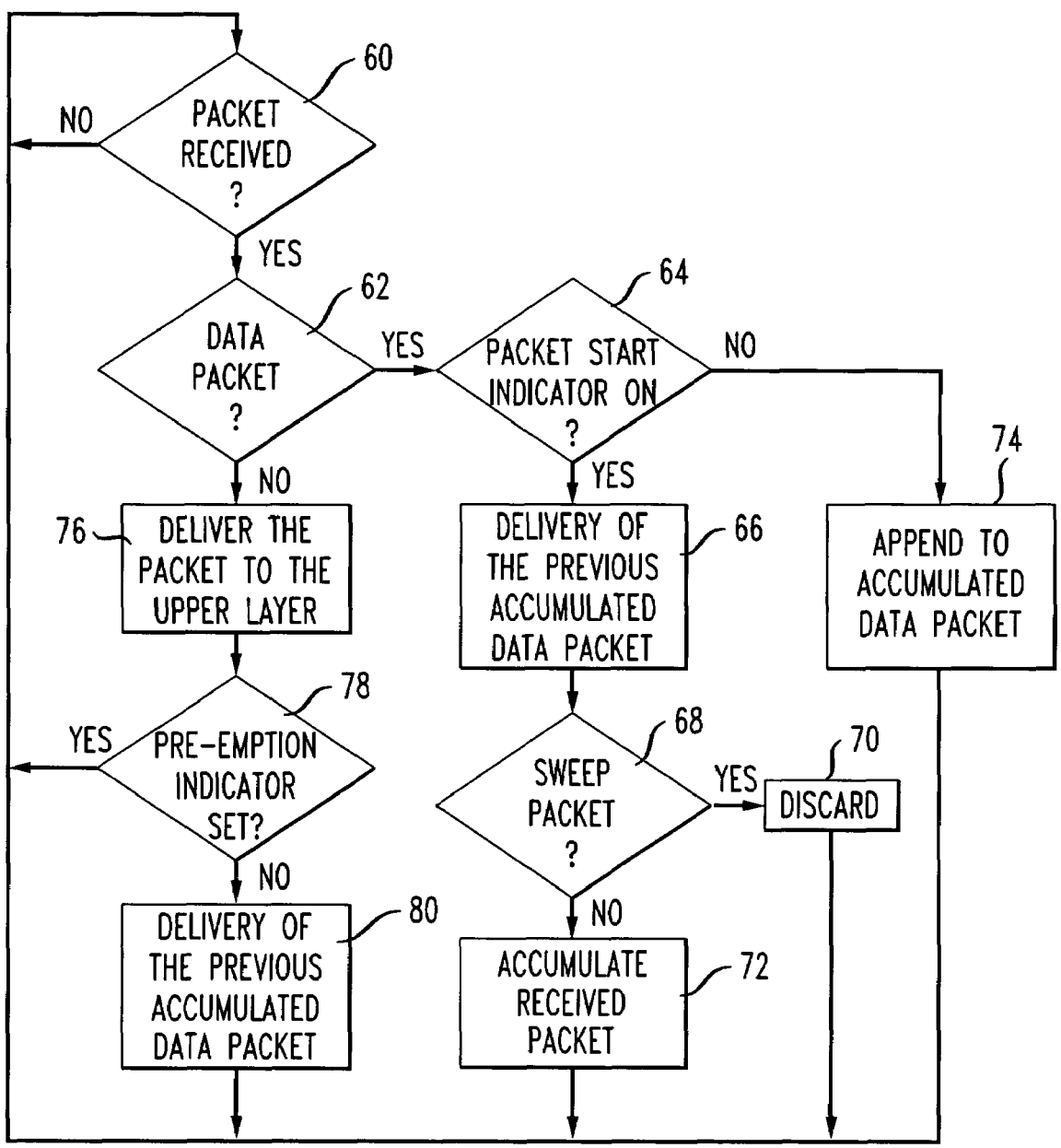
FIG. 4 is a flow chart showing the steps of the method according to the invention which are implemented in the receiver.

The method according to the invention on the receiver side is now described in reference to FIG. 4. The process starts by determining whether a new packet is received (step 60). This step is looped back until a new packet has been received. In such a case, a test determines whether it is a data packet (step 62). If so, a test determines whether the start packet indicator is set in the data packet (step 64). In such a case, the received packet is a segment which is the beginning of a new data packet (or a complete data packet). Any previously accumulated data packet is delivered to the upper layer 3 of the receiver (step 66).

At this stage, a test is performed to determine whether the received packet is a sweep packet or not (step 68). If so, the packet can be safely discarded (step 70). If not, the received packet is accumulated (step 72) since it is not possible to determine at this point whether the received segment is a complete data packet.

If, when a data packet has been received, it is determined that the packet start indicator is off, this means that the packet corresponds to a segment of a data packet. As it is not yet possible to determine if the corresponding data packet has been entirely received, the segment is appended to the previously accumulated segments of the same data packet (step 74) and kept within the receiver.

If it is determined that a voice packet has been received, such packet is delivered immediately to the upper layer (step 76). A test is then made to determine whether the pre-emption indicator is set or not (step 78). If not, this means that any previously accumulated data segments can be delivered to the receiver's upper layer (step 80). If the pre-emption indicator is set, this means that the voice packet just received has pre-empted a data packet and the previously received data packet has not been entirely transmitted.

It must be noted that, after a sweep packet has been discarded (step 70), or after the first segment of a data packet is accumulated (step 72), or after a segment of the data packet is appended to the already accumulated data packet (step 74), or after it is determined that the pre-emption indicator has been set (step 78), or after the delivery of the previous accumulated data packet to the upper layer (step 80), the process is looped back to the beginning to wait for the reception of a new packet.

While this invention has been described in a preferred embodiment, other embodiments and variations can be effected by a person of ordinary skill in the art without departing from the scope of the invention.

The invention claimed is:

1. A method performed by a packet transmitter for transmitting high priority packets in an Internet Protocol (IP) based transmission network wherein low-priority packets or fragments of packets are transmitted between a transmitter and a receiver and wherein high priority packets pre-empt low-priority packets, the method comprising the steps, performed by the transmitter, of:
   determining whether a low-priority packet or a fragment of a low-priority packet is being transmitted from the transmitter to the receiver when a high-priority packet requires transmission;
   activating a reserved bit within the IP header of the high-priority packet, as a pre-emption indicator, and suspending transmission of said low-priority packet or fragment of a low-priority packet, in the event that a low-priority packet or a fragment of a low-priority packet is being transmitted;
   transmitting the high-priority packet having the pre-emption indicator activated; and
   restarting the transmission of the low-priority packet or the fragment of the low-priority packet after having transmitted the high-priority packet,
   wherein the reserved bit is within the IP header as a packet start indicator in each low-priority packet or fragment,
   wherein the reserved bit used as a packet start indicator is set to a first binary value in a first segment of a low-priority packet or fragment being transmitted, the reserved bit being reset to a second binary value when a high-priority packet requires transmission and a low-priority packet or fragment is pre-empted, and wherein the reserved bit is within the flag field within the IP header of a packet.

2. The method of claim 1, wherein the pre-emption indicator is not activated in the event that no low-priority packet or fragment is being transmitted when the high-priority packet is transmitted.

3. The method of claim 1 further comprising the step of transmitting a sweep packet when no high-priority packet requires transmission after a low-priority packet or fragment has been transmitted, the sweep packet being a packet without data indicating that the previous transmission of a low-priority packet or fragment has been completed.

4. A method performed by a receiver that receives high priority packets from an Internet Protocol (IP) based transmission network, wherein low-priority packets or fragments of packets are transmitted between a transmitter and the receiver, wherein high priority packets pre-empt low-priority packets and wherein each of the packets includes an header that includes at least a Flags field and a Type-of-Service field that is different from said Flags field, the method comprising the steps, performed by the receiver, of:
   determining whether a high-priority packet has been received by the receiver;
   determining whether a reserved bit within the IP header of the high-priority packet has been activated, the reserved bit being a bit within said Flags field within the IP header of the packet;
   waiting for reception of a new packet if the reserved bit has been activated, the activated reserve bit indicating that the high-priority packet has pre-empted a low-priority packet; and
   determining whether the reserved bit used as a packet start indicator has been activated when the packet being received by the receiver is a low-priority packet or fragment, the low-priority packet or fragment being a segment to be appended to the received low-priority packet or fragment if the packet start indicator is inactive.

5. The method according to claim 4, wherein a previously received low-priority packet or fragment is delivered to the upper layer when the reserved bit used as a pre-emption indicator has been activated in the high-priority packet, and wherein an inactivated pre-emption indicator indicates that the transmission of the previously received low-priority packet or fragment has been completed.

6. The method of claim 5, wherein the received low-priority packet or fragment is delivered to the upper layer when the reserved bit used as a packet start indicator is active, indicating that the reception of the previously received low-priority packet or fragment has been completed.

7. The method of claim 6, further comprising the step of determining whether the packet being received is a sweep packet without data, the sweep packet indicating that the transmission of a low-priority packet or fragment has been completed.

8. The method of claim 7, wherein the step of determining whether the packet being received is a low-priority packet or a high-priority packet is determined by said Type-of-Service field within the IP header of the received packet.

9. The method of claim 8, wherein the high-priority packet is a voice packet and the low-priority packet or fragment is a data packet or fragment.

* * * * *